United States Patent
Wu et al.

[11] Patent Number: 5,349,683
[45] Date of Patent: Sep. 20, 1994

[54] BIDIRECTIONAL FIFO WITH PARITY GENERATOR/CHECKER

[75] Inventors: Sheau-Dong Wu, Saratoga; Hiro Yoshida, Santa Clara, both of Calif.

[73] Assignee: Mosel-Vitelic, San Jose, Calif.

[21] Appl. No.: 916,304

[22] Filed: Jul. 16, 1992

[51] Int. Cl.5 ............................................... G06F 5/06
[52] U.S. Cl. ................... 395/800; 364/244.3; 364/965.4
[58] Field of Search ............... 395/250, 425, 500, 725, 395/775, 800

[56] References Cited

U.S. PATENT DOCUMENTS

| | | | |
|---|---|---|---|
| 4,642,794 | 2/1987 | Lavelle | 364/DIG. 1 |
| 4,672,646 | 6/1987 | Maren | 377/70 |
| 4,835,418 | 5/1989 | Hsieh | 307/473 |
| 4,899,307 | 2/1990 | Lenoski | 365/78 |
| 5,079,693 | 1/1992 | Miller | 395/250 |
| 5,132,987 | 7/1992 | Motohashi | 375/3 |
| 5,173,619 | 12/1992 | Gaudenzi | 307/272.2 |
| 5,248,908 | 9/1993 | Kimura | 307/465 |

OTHER PUBLICATIONS

Cypress Semiconductor Preliminary CY7C439 data sheet.
Sharp LH5420 data sheet.

*Primary Examiner*—David Y. Eng
*Attorney, Agent, or Firm*—Claude A. S. Hamrick

[57] ABSTRACT

A bidirectional first-in first-out buffer device including on a single chip a single bank FIFO memory array, two bidirectional input/output ports, an input multiplexer for selecting which port to input data from, an output multiplexer for selecting which port to output data to, a byte/word converter for converting input data from a byte format to a word format, a word/byte converter for converting output data from a word format to a byte format, a parity generator/checker for generating parity output signals or confirming parity input signals, a flag generator for generating empty/full and half full flags, and control logic for controlling the direction, format and timing of data flow. The device is packaged in a 52-pin plastic leaded chip carrier package.

6 Claims, 6 Drawing Sheets

BIDIRECTIONAL FIFO WITH PARITY GENERATOR/CHECKER

BACKGROUND OF THE INVENTION

1. Field of the Invention

The present invention relates generally to memory devices used in computerized control systems and more particularly to an improved first-in-first-out (FIFO) buffer having bidirectional input/output ports and on-chip parity generation and checking circuitry operative to save space and power and reduce component count and manufacturing cost in typical applications.

2. Description of the Prior Art

Digital electronic first-in-first-out (FIFO) buffers are typically used by electronic system designers to alleviate "bottleneck" conditions that arise during communication between two or more digital systems of widely differing operating frequencies (a computer and its peripherals, for example). These FIFOs operate by "buffering", or temporarily storing, data from the transmitting system until the receiving system is ready to accept the data.

Small bipolar FIFO buffers (typically, 16 words by 4 bits) emerged in the late 1970's. The architecture then was primarily shift-register oriented with a unidirectional data bus. Even with bipolar technology, these FIFOs had relatively slow data transfer rates, typically less than 5 Mhz. Since that time, CMOS technology has brought to market many larger and faster parallel FIFOs. The mainstream products on the market now are parallel FIFOs with typical densities of 1K×9 to 4K×9. With CMOS technology, the majority of these devices have access times in the 25 ns to 35 ns range. However, modern 32-bit CISC and RISC microprocessor systems, with system bus frequencies of 40 MHz to 50 MHz or higher, dictate a need for buffers with faster access times and the ability to support wider data buses. Further, at these high speeds, retaining high data integrity has become a critical problem. System designers have typically included external parity generating and checking hardware to insure data integrity. However, this is a less than ideal solution, because it increases data path length, power consumption, and component space required, all of which are at a premium in modern designs.

An additional concern for system designers is the "bottleneck" condition that arises between digital systems with different bus widths. For example, many peripherals still operate on an 8 bit data bus, while most modern microprocessors have a bus width of 16 bits or larger. This is typically handled by forcing the microprocessor to communicate over only a portion of its bus. This has the effect of drastically increasing the time required by the microprocessor to transmit information.

For many FIFO applications, system designers have been forced to use multiple parallel FIFO chips to implement two buffers, one to receive and one to send data. The modern bidirectional first-in-first-out (BiFIFO) buffer was developed in response to this need. Such a device utilized two bidirectional ports, thus allowing it to buffer data in either direction. There are two classes of these BiFIFOs: single-core and dual-core.

The single-core, half-duplex devices are built upon a single, unidirectional FIFO core with bidirectional input/output ports; as such, it supports buffering in only one direction at a time. A Cypress Semiconductor component data sheet discloses such a single-core bidirectional FIFO, designated part number CY7C439. However, this device does not address the problems of data integrity or communication between systems with different bus widths. In addition, its minimum access time of 30 ns is insufficient for some modern high speed applications.

The dual-core, full-duplex devices, in contrast, include two unidirectional FIFO cores oriented in opposite directions, allowing buffering of data in both directions at the same time. However, because these devices employ two FIFO cores, they consume much more power than the single-core devices. A Sharp component data sheet discloses such a dual-core bidirectional FIFO, designated part number LH5420.

SUMMARY OF THE PRESENT INVENTION

It is therefore an object of the present invention to provide an improved FIFO buffer device having features which accommodate buffered communications between two digital systems having different operating frequencies.

Another object of the present invention to provide an improved FIFO buffer device of the type described which allows communication between two systems in both directions.

Another object of the present invention is to provide an improved FIFO buffer device of the type described which allows measurement of data integrity.

Another object of the present invention is to provide an improved FIFO buffer device of the type described which allows communication between two systems having different bus widths.

Another object of the present invention is to provide an improved FIFO buffer device of the type described which allows read and write operations to be performed independently and asynchronously.

Another object of the present invention is to provide an improved FIFO buffer device of the type described, the use of which will result in cost savings and convenience.

Another object of the present invention is to provide an improved FIFO buffer device, the use of which will result in savings in power consumption and component space.

Another object of the present invention is to provide an improved FIFO buffer device which will have an access speed sufficient to support modern high speed digital systems.

Briefly, a preferred embodiment of the present invention includes on a single chip a single bank FIFO memory array, two bidirectional input/output ports, an input multiplexer for selecting which port to input data from, an output multiplexer for selecting which port to output data to, a byte/word converter for converting input data from a byte format to a word format, a word/byte converter for converting output data from a word format to a byte format, a parity generator/checker for generating parity output signals or confirming parity input signals, a flag generator for generating empty/full and half full flags, and control logic for controlling the direction, format and timing of data flow.

Among the advantages of the present invention is that it can be used to replace several buffer and control components normally used for bidirectional buffered communication between digital systems.

Another advantage of the present invention is that it includes two input/output ports so that a single FIFO memory array can be used for half-duplex bidirectional buffered communication.

Yet another advantage of the present invention is includes a parity generator/checker to generate and check parity values in order to ensure data integrity.

A further advantage of the present invention is that it includes byte/word and word/byte converters to allow buffered communication between digital systems having different bus widths.

A still further advantage of the present invention is that it uses high performance CMOS technology to allow high speed buffered communications between digital systems.

These and other objects and advantages of the present invention will no doubt become apparent to those skilled in the art after having read the following detailed description of the preferred embodiment illustrated in the several figures of the drawing.

IN THE DRAWING

DETAILED DESCRIPTION OF THE PREFERRED EMBODIMENT

Figure 1:
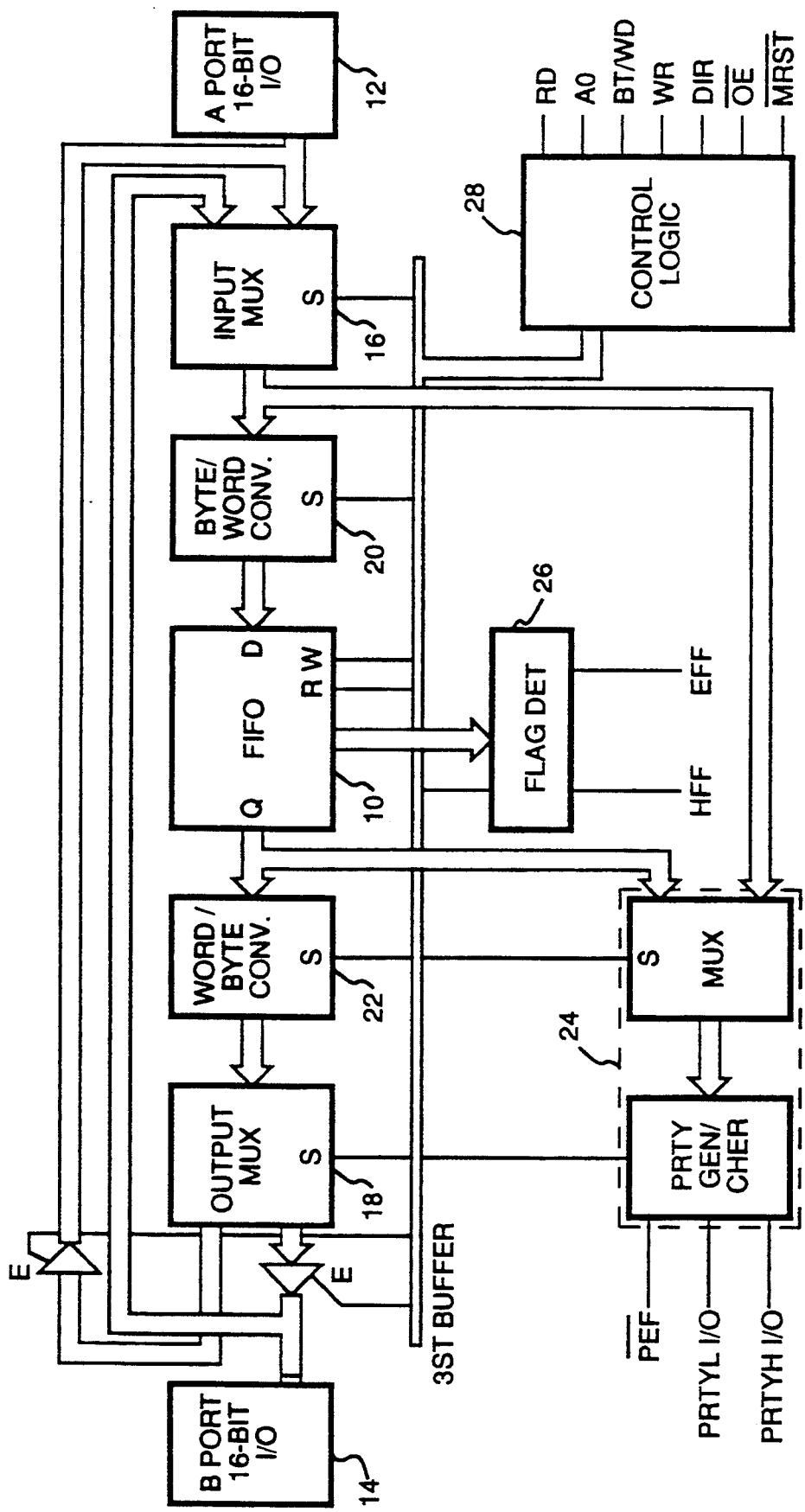
FIG. 1 is a block diagram illustrating the principal functional components of the present invention.

Referring now to FIG. 1 of the drawing, a bidirectional FIFO in accordance with the present invention is shown in block diagram form to include a single bank FIFO memory array (10), two bidirectional input/output ports A and B (12 and 14), an input multiplexer (16) for selecting which port to input data from, an output multiplexer (18) for selecting which port to output data to, a byte/word converter (20) for converting input data from a byte format to a word format, a word/byte converter (22) for converting output data from a word format to a byte format, a parity generator/checker (24) for generating parity output signals or confirming parity input signals, a flag generator (26) for generating empty/full and half full flags, and control logic (28) for controlling the direction, format and timing of data flow. The external signals associated with the device include read control (RD), write control (WR), direction control (DIR), A-port I/O lines (DQA0–DQA15), B-port I/O lines (DQB0–DQB15), byte/word select (BT/WD), byte select (A0), parity (PRTYL and PRTYH), empty/full (EFF), half-full (HFF), output enable (OE), parity error (PEF) and master reset (MRST).

The present invention performs two distinct operations: a write to the FIFO and a read from the FIFO. The read operation consists of the following steps: the input multiplexer 16 takes a data word from one of the bidirectional ports 12 or 14 and passes it on to the byte/word converter 20. The byte/word converter 20 performs a byte-to-word conversion, if necessary, and sends the converted data on to the FIFO memory array 10. Finally, the memory array 10 stores the data in the next available location. A write operation consists of the following steps: the memory array 10 reads the data word from the first available location, and passes it on to the word/byte converter 22. The word/byte converter performs a word-to-byte conversion, if necessary, and sends the converted data on to the output multiplexer 18, which outputs the data word to one of the bidirectional data ports 12 or 14.

The input multiplexer 16 responds to signals from the control logic 28 to choose which of the ports 12 or 14 will function as the input port. The input mux 16 receives input data from the port functioning as the input port, and sends this data on to the byte/word converter 20.

The byte/word converter 20 responds to signals from the control logic 28 to determine whether or not byte-to-word assembly needs to be done. When the B-port 14 is used as the input port, it has the ability to input data in a 8-bit byte format. Since the FIFO memory array 10 stores and retrieves data in a 16-bit word format, this data must be converted into a 16-bit word format by the byte/word converter 20, which assembles a word from every two successive bytes. If the control logic indicates that byte-to-word assembly is not required, then the byte/word converter simply passes the data straight through without any operation. In either case, the 16-bit data is then output to the FIFO memory array 10.

The FIFO memory array 10 is, in this embodiment, a 64 by 16 FIFO memory. The memory array 10 responds to signals from the control logic 28 which indicate when a read or write operation should be executed. When a word of data is received and stored into a memory location in the memory array 10, an internal write pointer is incremented to point to the memory location that the next word of data will be written into. Similarly, when a word of data is retrieved and output from the memory array, a read pointer is incremented to point to the next word of data to be read.

The word/byte converter 22 responds to signals from the control logic 28 to determine whether or not word-to-byte disassembly needs to be done. When the B-port 14 is used as the output port, it has the ability to output data in an 8-bit byte format. Since the FIFO memory array 10 stores and retrieves data in a 16-bit word format, this data must be converted into an 8-bit byte format by the word/byte converter 22, which splits every word into two successive bytes. If the control logic indicates that word-to-byte splitting is not required, then the word/byte converter simply passes the data straight through without any operation. In either case, the data is then output to the output multiplexer 18.

The output multiplexer 18 responds to signals from the control logic 28 to choose which of the ports 12 or 14 will function as the output port. The output mux 18 receives data from the word/byte converter 22, and outputs this data to the port functioning as the output port.

The parity generator/checker 24 responds to signals from the control logic 28 to determine whether to function as a parity signal generator or to function as a parity checker. The parity generator/checker always operates upon data at the A port. When the A port 12 is used as an output port, the parity generator/checker 24 functions as a parity signal generator, receiving an output data word as it is output from the FIFO memory array 10, and computing odd parity signals for both the upper and lower bytes of the output data word. These odd parity signals are output on PRTYH (for the high byte) and PRTYL (for the low byte). Alternatively, when the A port 12 is used as an input port, the parity generator/checker 24 functions as a parity signal checker. It receives an input data word as it is output from the input multiplexer 16, and computes odd parity values for both the upper and lower bytes. These computed parity values are compared to corresponding parity signals received on PRTYH and PRTYL, and any discrepancy will cause the parity error flag ($\overline{PEF}$) to go low, indicating a parity error.

The flag generator 26 responds to the read and write pointers of the FIFO memory array 10 to generate an empty/full flag EFF and a half full flag HFF. Whenever the read and write pointers point to the same memory location in the memory array 10, the empty/full flag will go HIGH, indicating that the memory array 10 is either empty or full. Whenever the memory array is at least half full, the half full flag HFF will be HIGH. Thus, if both HFF and EFF are HIGH, then the memory array 10 is full, while a LOW HFF and a HIGH EFF indicate an empty memory array.

Control logic 28 responds to signals RD, WR, DIR, BT/WD, A0, $\overline{OE}$ and $\overline{MRST}$ and generates signals which control the operation and timing of all other components of the present invention. When a LOW to HIGH transition occurs on the write control signal WR, the control logic 28 sends signals to the FIFO memory array 10 indicating that a word of data is to be written into the FIFO location determined by the write pointer. Similarly, when a LOW to HIGH transition occurs on the read control signal RD, the control logic 28 sends signals to the FIFO memory array 10 indicating that a word of data is to be read from the FIFO location determined by the read pointer. The directional control signal DIR indicates which port, A or B, is the input port and which is the output port; LOW indicates A is the input port and B is the output port, while HIGH indicates the reverse. The control logic 28 uses this information to send appropriate signals to the input mux 16 and the output mux 18 indicating which port they should communicate with. The byte/word select signal BT/WD indicates the B port data width; LOW indicates that the B port inputs or outputs 16-bit words, while HIGH indicates that the B port uses 8-bit bytes. The byte select signal A0 is used in 8-bit byte mode to indicate which half of a 16-bit word is represented by the current byte. When A0 is HIGH, the current byte represents the upper byte (bits 8–15) of a 16-bit word, while A0 LOW indicates that the current byte is a lower byte (bits 0–7). The control logic 28 uses the information of BT/WD and A0 to send signals to the byte/word converter 20 and the word/byte converter 22 indicating the conversion to be performed. The control logic 28 also responds to the output enable signal $\overline{OE}$ to control the tri-state buffers which determine when data and parity signals should be output. When $\overline{OE}$ goes LOW, data is output to the output port and the generated parity signals PRTYH and PRTYL are output over their respective lines. Finally, the control logic is responsive to the master reset signal $\overline{MRST}$. When $\overline{MRST}$ goes low, the control logic 28 sends a signal to the FIFO memory array 10 which clears the read and write pointers so that they both point to the first memory location. Further, the output register of the FIFO memory array 10 is initialized to indicate LOW outputs. Finally, the control logic 28 sends a signal to the parity generator/checker 24 which forces the parity error flag $\overline{PEF}$ to HIGH, indicating no parity error.

Figure 2:
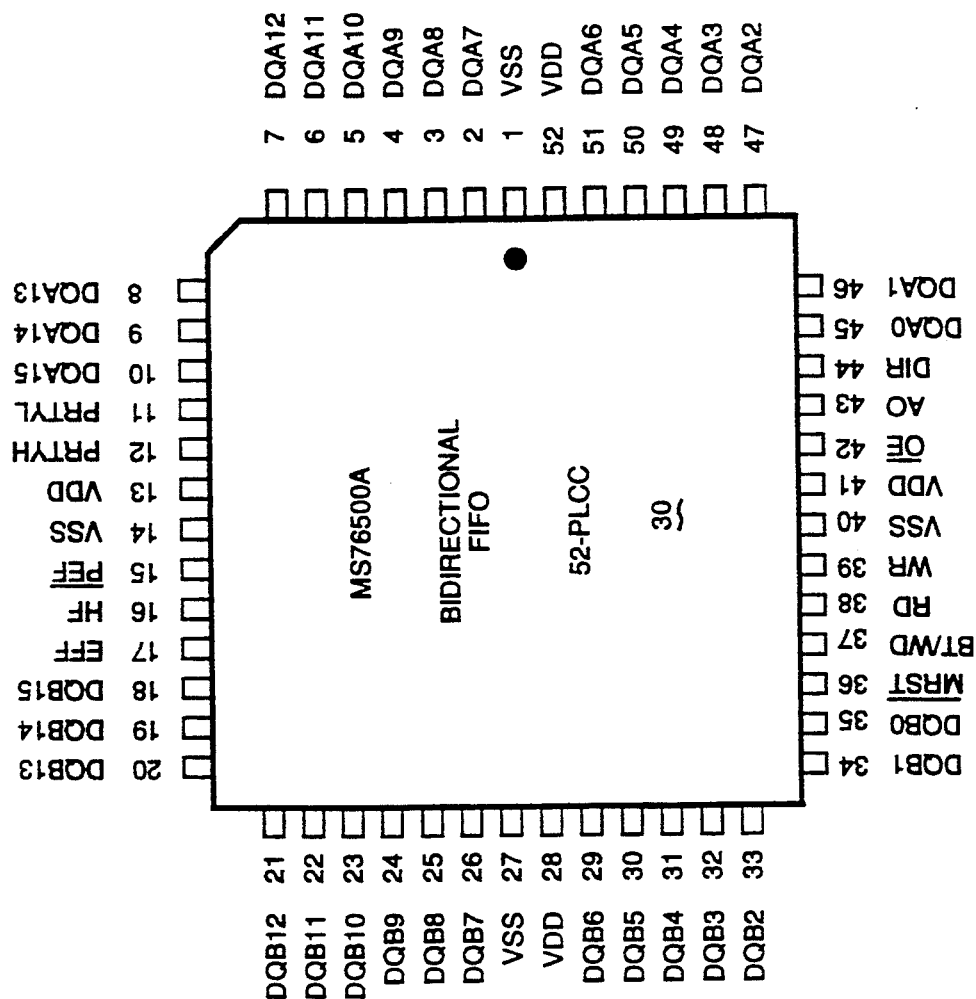
Fig. 2 is an illustration of an actual implementation of the present invention.

FIG. 2 shows a package configuration of an actual implementation of the present invention. The configuration depicted at 30 is a 64 by 16 BiFIFO in a 52-Lead Plastic Leaded Chip Carrier (PLCC) package. The present invention in its preferred form is manufactured using high performance CMOS technology and is optimized for use for buffered communication between high-speed digital systems. In many applications, one such device can replace a combination of multiple FIFOs and support chips. This configuration offers significant density, power and cost advantages over a discrete implementation. The preferred embodiment operates from a single +5 volt power supply, and all inputs and outputs are TTL compatible.

Figure 3A:
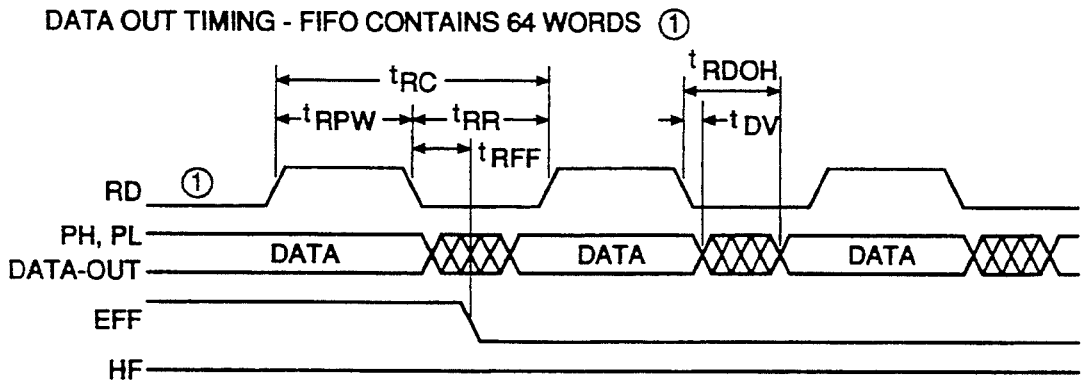
FIGS. 3a–3c and 4a–4c are timing diagrams illustrating operation of the present invention.

Referring now to FIG. 3 of the drawing, timing diagrams for FIFO read cycles are illustrated, indicating the timing relationships between the RD signal line, the output data, and the EFF and HFF flags. FIG. 3(a) depicts the situation in which data is read from a full FIFO. On the LOW to HIGH transition of RD, data is loaded from the FIFO location pointed to by the read pointer and put into the output register of the FIFO memory array 10. On the HIGH to LOW transition of the RD line, the read pointer is updated, and the flag outputs are combinatorily derived from the updated pointers. In this example, a data word is being read from a full FIFO, so that the FIFO is no longer full. Thus, after a short delay represented as $t_{RFF}$, the EFF flag transitions from HIGH to LOW, indicating that the FIFO is no longer full. In addition, $t_{RC}$ represents the read cycle time, $t_{RPW}$ represents the read pulse width, $t_{RR}$ represents the read recovery time, and $t_{DV}$ represents the data valid from read pulse HIGH.

Figure 3B:
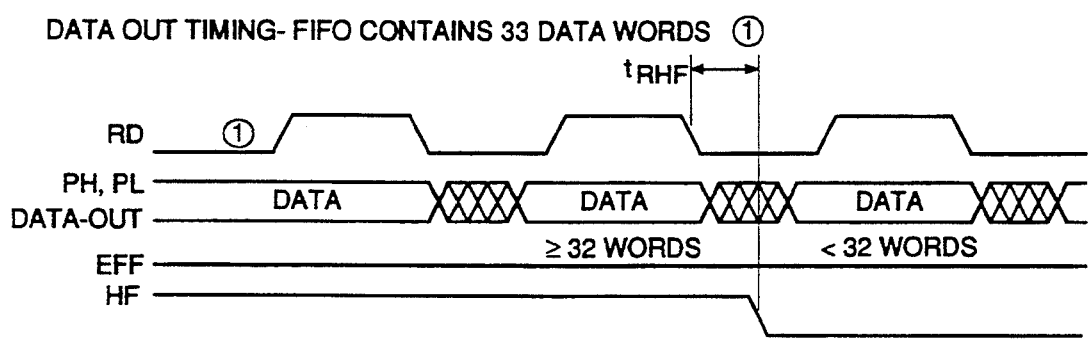
Figure 3C:
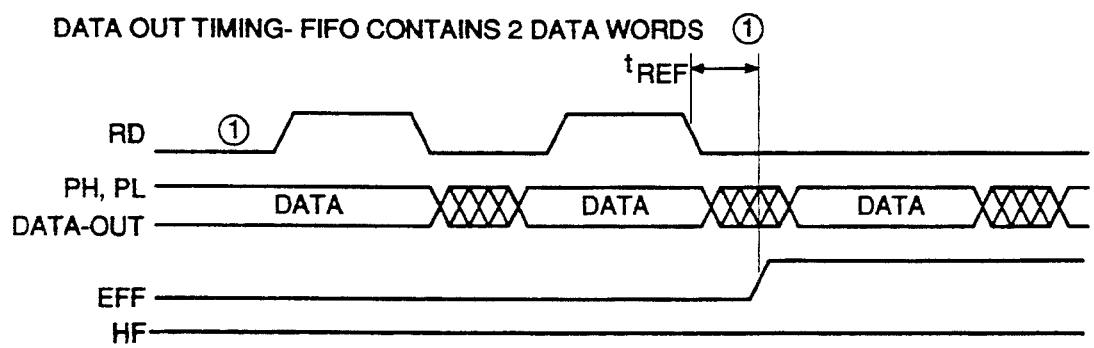

FIG. 3(b) depicts the situation in which data is read from a half-full FIFO, causing it to be less than half full. After a delay of $t_{RHF}$ from the HIGH to LOW transition on the RD line, the HFF flag goes low, indicating that the FIFO is no longer at least half full. Similarly, FIG. 3(c) depicts the situation in which the last data word is read from the FIFO, causing the FIFO to become empty. After a delay of $t_{REF}$ from the HIGH to LOW transition on the RD line, the EFF flag goes HIGH, indicating that the FIFO is now empty. In all of these diagrams, the timing waveform for the output parity signals PRTYH and PRTYL is the same as that of the output data, and portions of the waveforms that are crossed (XXX) denote areas in which the signals are changing and their state is unknown.

Figure 4A:
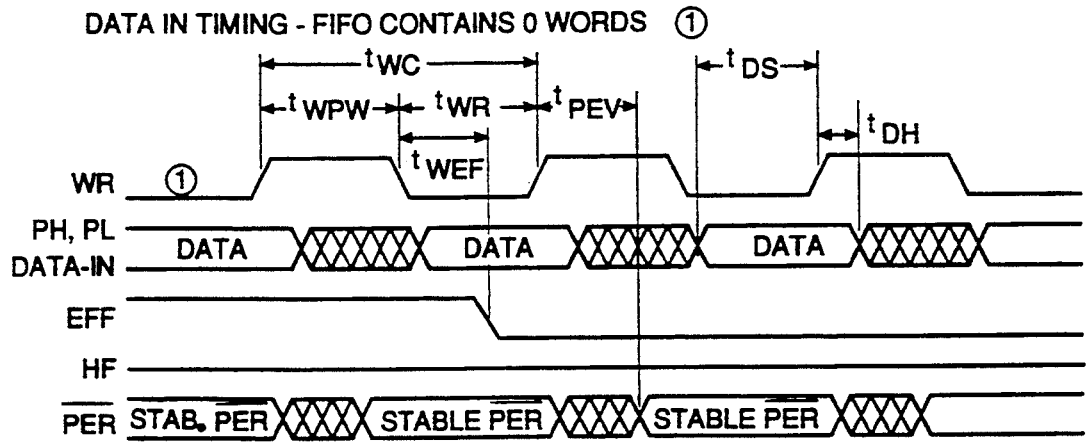

Referring now to FIG. 4 of the drawing, timing diagrams for FIFO write cycles are illustrated, indicating the timing relationships between the WR signal line, the input data, and the EFF and HFF flags. FIG. 4(a) depicts the situation in which data is written to an empty FIFO. On the LOW to HIGH transition of WR, data is taken from the input register of the FIFO memory array 10 and written to the FIFO location pointed to by the write pointer. After a short delay, represented as $t_{PEV}$, during which the parity generator/checker computes and compares parity values, the parity error flag PER is updated. On the HIGH to LOW transition of the WR line, the write pointer is updated, and the flag outputs are combinatorily derived from the updated pointers. In this example, a data word is being written to an empty FIFO, so that the FIFO is no longer empty. Thus, after a short delay, represented as $t_{WEF}$, during which the flags are combinatorily derived from the pointers, the EFF flag transitions from HIGH to LOW, indicating that the FIFO is no longer empty. In addition, $t_{WC}$ represents the write cycle time, $t_{WPW}$ represents the read pulse width, $t_{WR}$ represents the read recovery time, and $t_{DS}$ and $t_{DH}$ represent the data setup and hold times, respectively, from the RD LOW to HIGH transition.

Figure 4B:
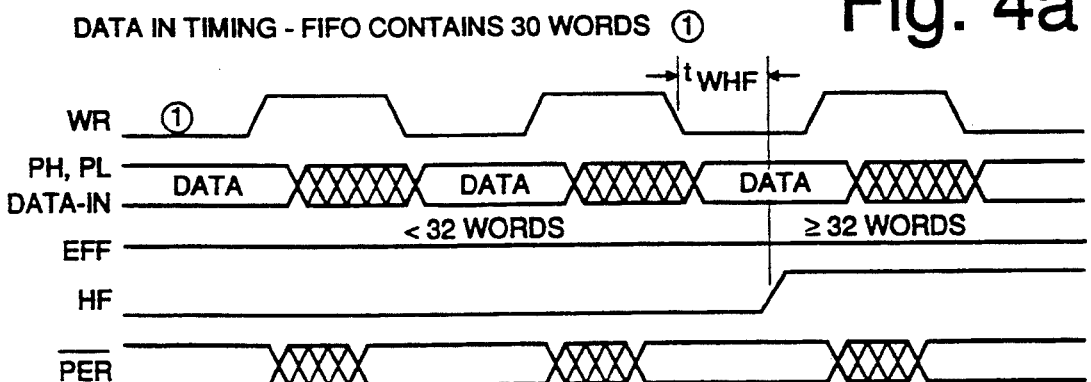
Figure 4C:
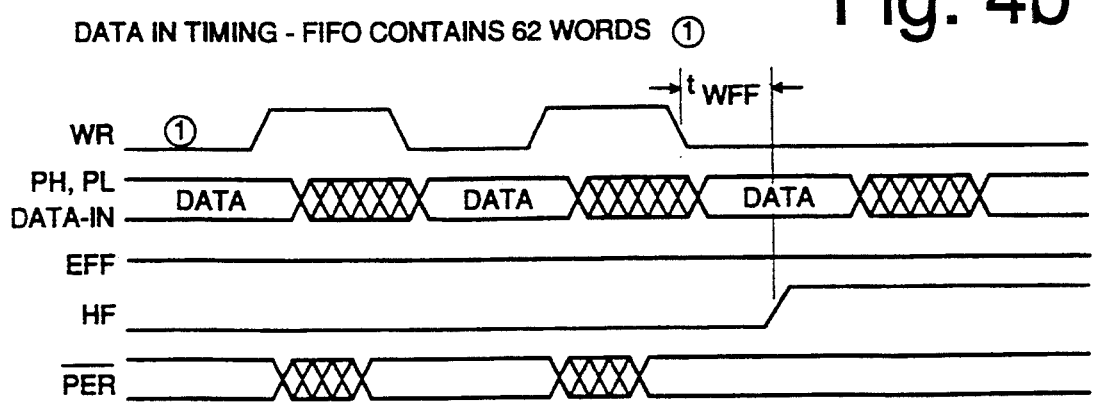

FIG. 4(b) depicts the situation in which data is written to a less-than-half-full FIFO, causing it to become half full. After a delay of $t_{WHF}$ from the HIGH to LOW transition on the WR line, the HFF flag goes HIGH, indicating that the FIFO is now at least half full. Similarly, FIG. 4(c) depicts the situation in which a data word is written to the FIFO, causing the FIFO to become full. After a delay of $t_{WFF}$ from the HIGH to LOW transition on the WR line, the EFF flag goes HIGH, indicating that the FIFO is now full. In all of these diagrams, the timing waveforms for the input parity signals PRTYH and PRTYL are the same as that of the input data, and portions of the waveforms that are crossed (XXX) denote areas of a "don't care" condition in which any changes are permitted.

Figure 5:
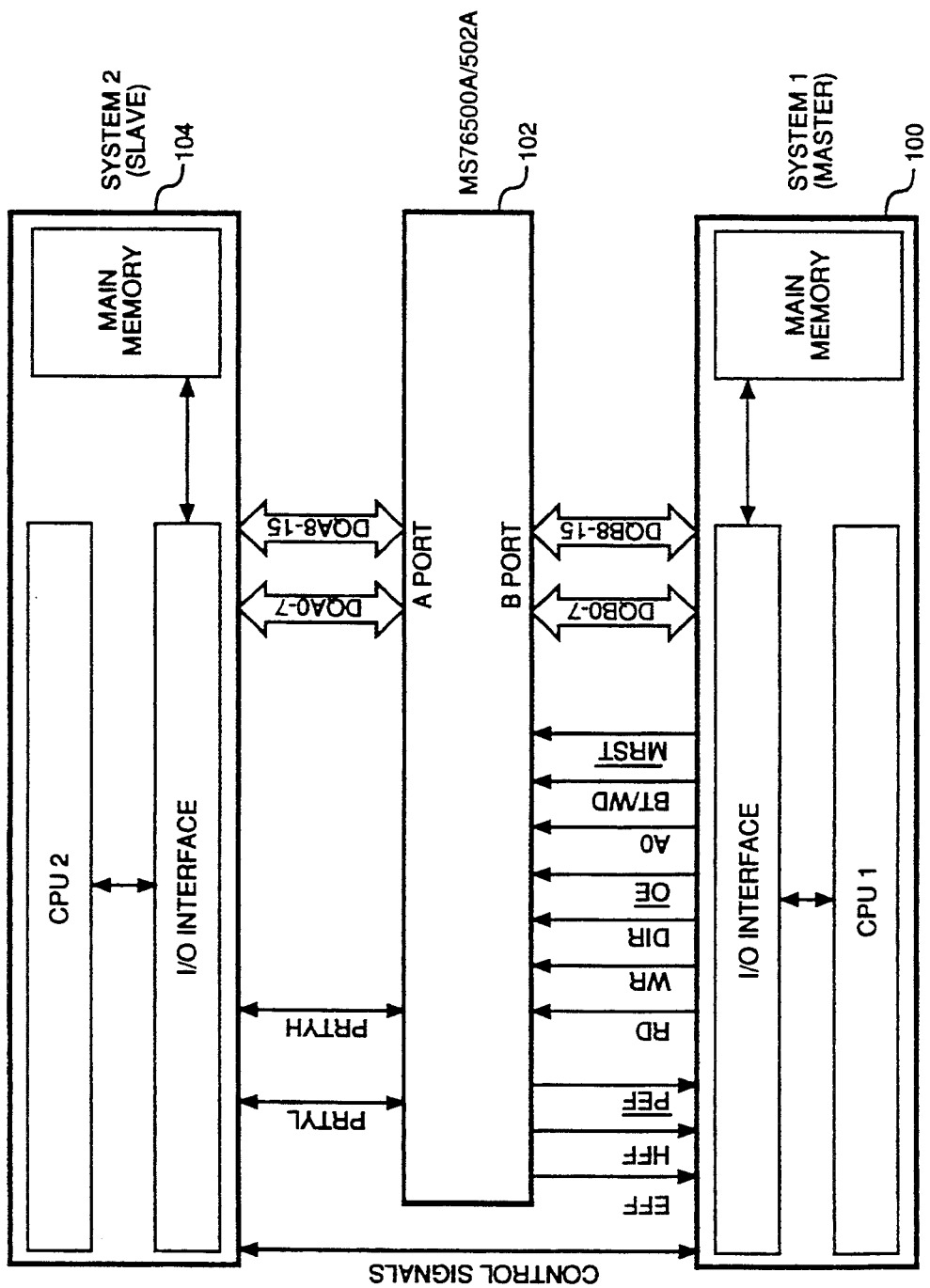
FIGS. 5 and 6 are schematics depicting applications of the present invention.

FIG. 5 depicts an application of the present invention as a buffer facilitating bidirectional communication between two computer systems operating at different speeds. The master computer system at 100 supplies the control signals for the bidirectional FIFO 102, while the slave system 104 supplies only parity signals. Thus, for example, if the master system 100 operates at a higher speed than the slave system 104, then the master system 100 can send a block of information to the BiFIFO quickly, and the slave system 104 can read the data from the BiFIFO at a slower rate. This is advantageous because the master system is not forced to send data at the slave system's slower rate, thus allowing the master system to perform other tasks while the slave system is reading the data. Similarly, for communication in the reverse direction (slave to master), the slave system can fill the buffer at a slow rate, and then the master system can read the data from the buffer very quickly. Thus, bidirectional communication between the two systems operating at different speeds is made more efficient by the use of the BiFIFO.

Figure 6:
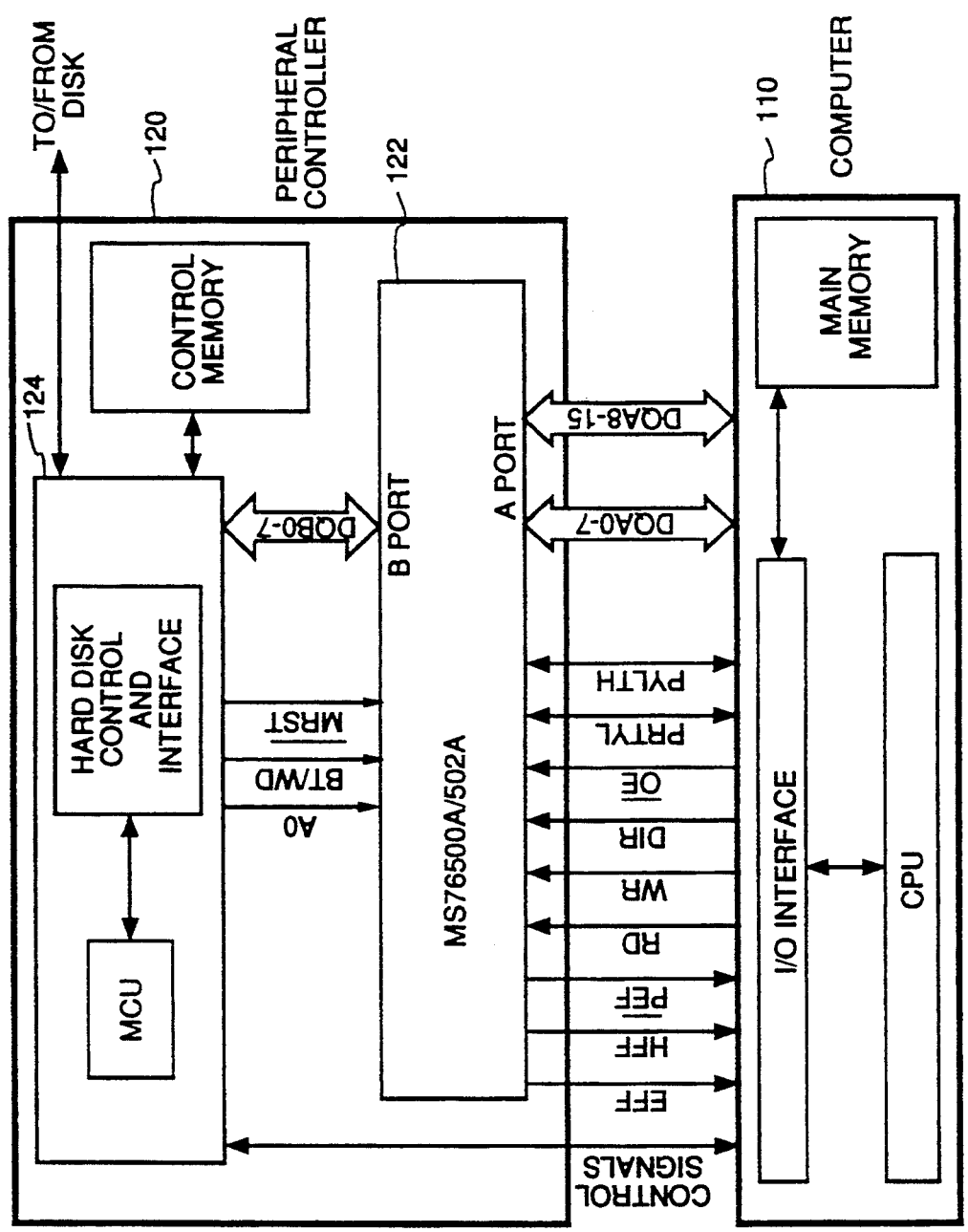

FIG. 6 depicts an application of the present invention used as part of a peripheral controller 120 for a hard disk to buffer data between a computer system 110 and a hard disk interface 124. This application utilizes the byte/word conversion feature of the present invention, allowing the computer 110 to communicate over a 16-bit (word-width) data bus, while the hard disk interface 124 communicates over an 8-bit (byte-width) bus. The computer system 110 supplies most of the control signals for the BiFIFO 122, while the hard disk interface 124 supplies those signals necessary for byte/word conversion. Without the buffer, the computer would be forced to communicate directly with the hard disk interface over an 8-bit bus, thereby doubling the computer time required to perform a disk I/O operation. In addition, the use of a buffer allows the computer 110 and the hard disk interface 124 to operate at different speeds without adversely affecting communication efficiency.

Although the present invention has been described above in terms of a preferred embodiment, it will be appreciated that various alterations and modifications thereof may become apparent to those of ordinary skill in the art. It is therefore intended that the appended claims cover all such alterations and modifications as fall within the true spirit and scope of the invention.

What is claimed is:

1. A single chip integrated circuit bidirectional memory buffer device comprising:

a first bidirectional data port;
a second bidirectional data port;
an input multiplexer responsive to a first control signal, wherein when said first control signal is of a first state:
  said input multiplexer is operative to receive a series of data words from said first bidirectional data port, and output said data words;
and when said first control signal is of a second state:
  said input multiplexer is operative to receive a series of data words from said second bidirectional data port, and output said data words;
a byte/word converter responsive to a second control signal, wherein when said second control signal is of a first state:
  said byte/word converter is operative to receive a set of input data words, each x-bits in length, from the input mux, to construct an assembled data word, y-bits in length, where y is greater than x, by concatenating the bits of the set of input data words, and to output said assembled data word;
and when said second control signal is of a second state:
  said byte/word converter is operative to receive input data words, y-bits in length, from the input mux, and output said input data words unchanged in length;
a FIFO memory array responsive to a third control signal, wherein upon receipt of said third signal:
  said FIFO memory array is operative to receive a data word from the byte/word converter, to write said data word into a memory location indicated by a write pointer, and to update said write pointer to indicate the next memory location available to be written to;
said FIFO memory array further responsive to a fourth control signal, wherein upon receipt of said fourth signal:
  said FIFO memory array is operative to read a data word from a memory location indicated by a read pointer, to output said data word, and to update said read pointer to indicate the location of the next data word to be read;
a word/byte converter responsive to a fifth control signal, wherein when said fifth control signal is of a first state:
  said word/byte converter is operative to receive a data word from the FIFO memory array, to construct a set of disassembled data words, each containing a part of the received data word, and to output said disassembled data words;
and when said fifth control signal is of a second state:
  said word/byte converter is operative to receive data words from the FIFO memory array, and to output said data words unchanged;
an output mux, responsive to a sixth control signal, wherein when said sixth control signal is of a first state:
  said output multiplexer is operative to receive a series of data words from said word/byte converter, and to output said data words to said first bidirectional data port;
and when said sixth control signal is of a second state:
  said output multiplexer is operative to receive a series of data words from said word/byte converter, and to output said data words to said second bidirectional data port;

control logic responsive to external input signals, and operative to generate said first, second, third, fourth, fifth and sixth control signals.

2. A single chip integrated circuit bidirectional memory buffer device as recited in claim 1, further comprising:

a parity generator/checker responsive to a seventh control signal, wherein when said seventh control signal is of a first state:

said parity generator/checker is operative to receive an input data word from the input multiplexer, to compute a set of parity values corresponding to the input data word, to compare the set of parity values to a set of parity inputs, and to output a parity error flag if the set of parity values does not equal the set of parity inputs;

and when said seventh control signal is of a second state:

said parity generator/checker is operative to receive an output data word from the FIFO memory array, and to generate a set of parity outputs corresponding to the output data word;

and wherein said control logic is further operative to generate said seventh control signal.

3. A single chip integrated circuit bidirectional memory buffer device as recited in claim 1 wherein said device is packaged in a 52-pin plastic leaded chip carrier package.

4. A single chip integrated circuit bidirectional memory buffer device as recited in claim 2 wherein said device is packaged in a 52-pin plastic leaded chip carrier package.

5. A bidirectional high speed buffered digital communication system comprising:

a first high speed digital transceiver;
a second high speed digital transceiver;
a bidirectional memory buffer device including:
a first bidirectional data port communicatively connected to said first transceiver;
a second bidirectional data port communicatively connected to said second transceiver;
an input multiplexer responsive to a first control signal,
wherein when said first control signal is of a first state:
said input multiplexer is operative to receive a series of data words from said first bidirectional data port, and output said data words;
and when said first control signal is of a second state:
said input multiplexer is operative to receive a series of data words from said second bidirectional data port, and output said data words;
a byte/word converter responsive to a second control signal, wherein when said second control signal is of a first state:
said byte/word converter is operative to receive a set of input data words, each x-bits in length, from the input mux, to construct an assembled data word, y-bits in length, where y is greater than x, by concatenating the bits of the set of input data words, and to output said assembled data word;
and when said second control signal is of a second state:
said byte/word converter is operative to receive input data words, y-bits in length, from the input mux, and output said input data words unchanged in length;
a FIFO memory array responsive to a third control signal, wherein upon receipt of said third signal:
said FIFO memory array is operative to receive a data word from the byte/word converter, to write said data word into a memory location indicated by a write pointer, and to update said write pointer to indicate the next memory location available to be written to;
said FIFO memory array further responsive to a fourth control signal, wherein upon receipt of said fourth signal:
said FIFO memory array is operative to read a data word from a memory location indicated by a read pointer, to output said data word, and to update said read pointer to indicate the location of the next data word to be read;
a word/byte converter responsive to a fifth control signal, wherein when said fifth control signal is of a first state:
said word/byte converter is operative to receive a data word from the FIFO memory array, to construct a set of disassembled data words, each containing a part of the received data word, and to output said disassembled data words;
and when said fifth control signal is of a second state:
said word/byte converter is operative to receive data words from the FIFO memory array, and to output said data words unchanged;
an output mux, responsive to a sixth control signal, wherein when said sixth control signal is of a first state:
said output multiplexer is operative to receive a series of data words from said word/byte converter, and to output said data words to said first bidirectional data port;
and when said sixth control signal is of a second state:
said output multiplexer is operative to receive a series of data words from said word/byte converter, and to output said data words to said second bidirectional data port;
control logic responsive to external input signals, and operative to generate said first, second, third, fourth, fifth and sixth control signals.

6. A bidirectional high speed buffered digital communication system as recited in claim 5, wherein said bidirectional memory buffer device further includes:

a parity generator/checker responsive to a seventh control signal, wherein when said seventh control signal is of a first state:

said parity generator/checker is operative to receive an input data word from the input multiplexer, to compute a set of parity values corresponding to the input data word, to compare the set of parity values to a set of parity inputs, and to output a parity error flag if the set of parity values does not equal the set of parity inputs;

and when said seventh control signal is of a second state:

said parity generator/checker is operative to receive an output data word from the FIFO memory array, and to generate a set of parity outputs corresponding to the output data word;

and wherein said control logic is further operative to generate said seventh control signal.

* * * * *